United States Patent [19]

Bazzani et al.

[11] 4,375,633

[45] Mar. 1, 1983

[54] CONTROL CIRCUIT FOR DIRECTION INDICATOR LAMPS IN VEHICLES WITH ALTERNATING CURRENT INSTALLATIONS

[75] Inventors: Fausto Bazzani, Spilamberto; Paolo Sevini, Bologna, both of Italy

[73] Assignee: Zanussi Elettromeccanica S.p.A., Pordenone, Italy

[21] Appl. No.: 241,844

[22] Filed: Mar. 9, 1981

[30] Foreign Application Priority Data

Mar. 17, 1980 [IT] Italy ............................ 45707 A/80

[51] Int. Cl.³ .............................................. B60Q 1/38
[52] U.S. Cl. ......................................... 340/73; 340/80; 340/331
[58] Field of Search ................ 340/73, 80, 81 R, 331, 340/134

[56] References Cited

U.S. PATENT DOCUMENTS 3,440,489 4/1969 Davidson et al. .................. 340/331

FOREIGN PATENT DOCUMENTS 2605450 8/1977 Fed. Rep. of Germany ...... 340/134
2843206 4/1980 Fed. Rep. of Germany ...... 340/134
1023612 5/1978 Italy .

Primary Examiner—Donald J. Yusko
Attorney, Agent, or Firm—Wenderoth, Lind & Ponack

[57] ABSTRACT

A control circuit for direction indicator lamps of a vehicle includes an alternating voltage generator suitable for feeding the lamps through a manual commutator or switch and at least one bi-directional conduction controlled diode which is driven by an impulse generator. The latter is suitably driven by the alternating voltage of the generator to furnish an output signal of alternating impulses synchronized with the zero changeovers of the alternating voltage. The impulse generator is driven by a timing stage with a signal of alternating blocking and admitting impulses.

12 Claims, 1 Drawing Figure

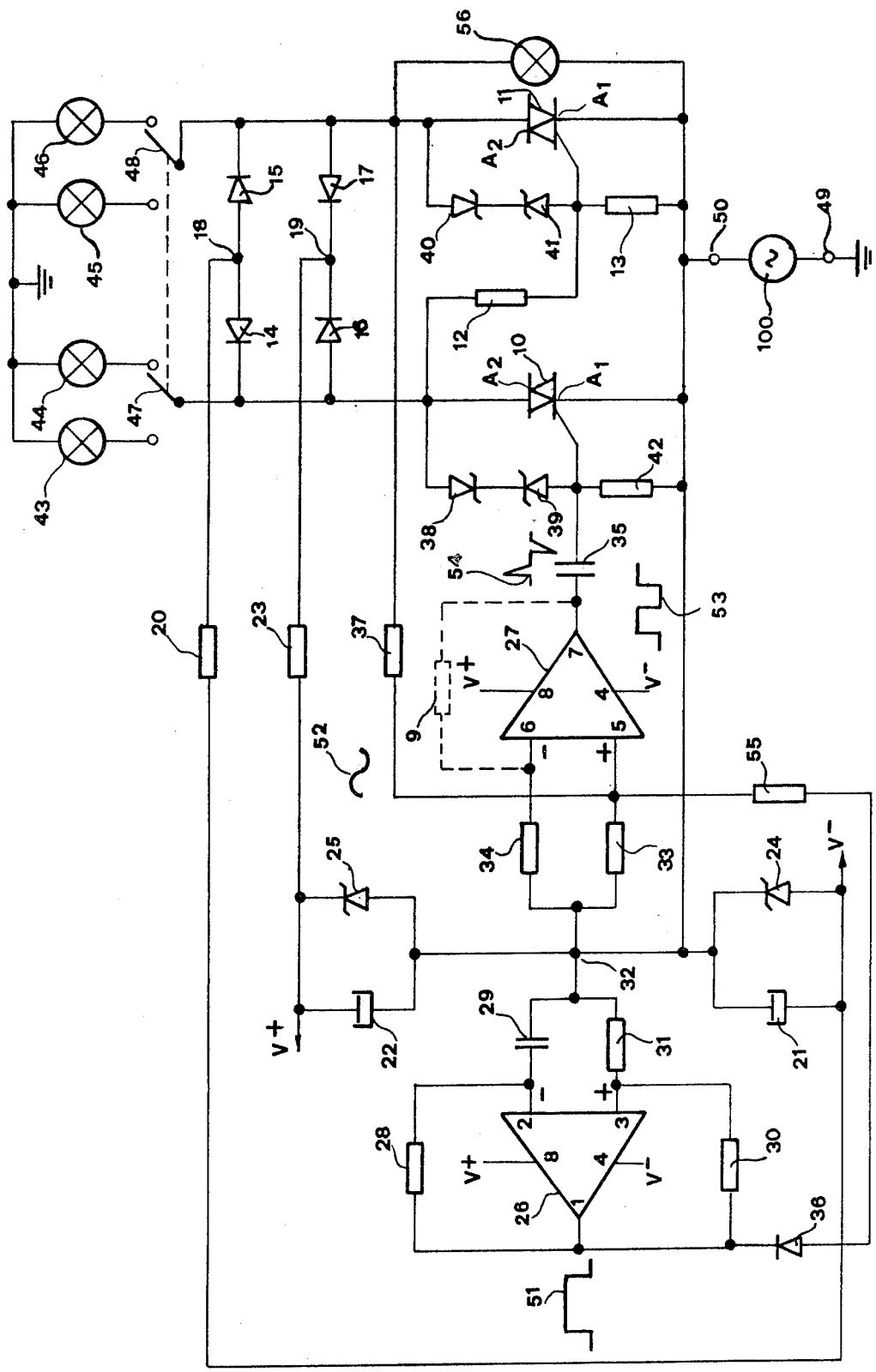

CONTROL CIRCUIT FOR DIRECTION INDICATOR LAMPS IN VEHICLES WITH ALTERNATING CURRENT INSTALLATIONS

BACKGROUND OF THE INVENTION

This invention relates to a circuit for timed control of the direction indicator lamps in vehicles with alternating current installations, particularly motorcycles with permanent magnet voltage generators.

A circuit of this type is disclosed in Italian Pat. No. 1,023,612. Such circuit utilizes bi-directional conduction controlled diodes, i.e. bi-directional thyristors, (commonly known as "TRIACs") for the feeding of the direction indicator lamps whose firing is driven by a threshold value circuit, which in turn is driven by a time constant timing circuit. This solution requires a unijunction transistor as the threshold value unit and allows the obtaining of switching on and switching off times of the indicator lights substantially independent of the rate conditions of the voltage generator of the vehicle, but requires for control of the bi-directional conduction controlled diodes undesireably elevated excitation voltages with elevated time constants of the timing circuit. Moreover, the driving of the bi-directional conduction controlled diodes, obtained with the voltage ramps having relatively long duration, does not take place in the more favorable phases, which notedly correspond to the first and third quadrants.

SUMMARY OF THE INVENTION

Consequently, it is an object of the present invention to provide a command circuit for direction indicator lamps of the type described above which will be reliable and precise in function, and which will allow for driving the bi-directional conduction controlled diodes with brief voltage impulses corresponding with the more favorable quadrants.

Another object of the present invention is to provide a simple control circuit of such type which allows driving of the bi-directional conduction controlled diodes with modest excitation voltages and reduced capacity values of the driving circuit.

These objects are achieved according to the invention, by the provision of a control circuit for the direction indicator lamps of a vehicle, including an alternating voltage generator suitable for feeding the lamps through a manual action commutator or switch and at least one bi-directional conduction controlled diode. The circuit is principally characterized by the fact that the control electrode of such bi-directional conduction controlled diode is linked to the output of an impulse stage generator suitable to be driven by the alternating voltage of the voltage generator to furnish an output signal of alternating impulses synchronized with the zero changeovers of the alternating voltage. The impulse generator is moreover driven by the output of a timing stage suitable to generate a signal of alternating blocking and admitting impulses for the function of the impulse generator.

The bi-directional conduction controlled diode thus is driven in correspondence to the first and the third quadrants, with excitation voltages notably reduced with respect to traditional solutions and known circuits of this type.

BRIEF DESCRIPTION OF THE DRAWINGS

Other characteristics and advantages of the present invention will be apparent from the following detailed description, provided for illustrative and not limiting purposes, with reference to the attached drawing, wherein:

The single FIGURE is a circuit diagram illustrating the principle of a preferred embodiment of a control circuit according to the invention, and in which are indicated the wave shapes of the fundamental signals present at various points of the circuit.

DETAILED DESCRIPTION OF THE INVENTION

With reference to the drawing, there is shown an alternating voltage generator 100 of the permanent magnet type conducted or driven by the crankshaft of a vehicle, for example a motorcycle. A head or terminal 49 of the generator 100 is connected to ground and then to a common terminal of a group of direction indicator lamps 43, 44, 45, 46 of the vehicle.

For example, the lamps 43, 45 indicate the left direction with respect to the direction of movement of the vehicle and are arranged respectively on the left side of the front and rear portions of the vehicle itself. Similarly, the lamps 44, 46 indicate the right direction. Each pair of lamps can be selectively operationally connected to or inserted in the circuit by means of a double manual action commutator or switch having a pair of movable contacts 47, 48 which are movable in linked fashion into contact with terminals of lamps 43, 45, respectively, or of lamps 44, 46, respectively.

The movable contacts 47, 48 are connected to the other head or terminal 50 of the generator 100 through respective bi-directional conduction controlled diodes 10, 11. The contact 47 also is connected to the terminal 50 of the generator through a series connected pair of bias resistors 12 and 13, whose junction point is connected to the control electrode of the bi-directional conduction controlled diode 11.

Between the movable contacts 47 and 48 is arranged a rectifier bridge of diodes 14, 15, 16, 17 having two output terminals 18 and 19 which are connected to each other by the series arrangement of a limiter-resistor 20, two filter capacitors 21, 22 and a limiter-resistor 23.

Connected in parallel to the capacitors 21, 22 are respective Zener diodes 24, 25 having the function of limiting the feeding voltage. Moreover, a common point 32 between the capacitors 21, 22 is connected directly to the terminal 50 of the voltage generator.

The capacitors 21, 22 are preferably of the electrolytic type, are polarized as shown in the drawing, and provide a continuous feeding source of the circuit. In particular, the anode of the capacitor 22 is a positive pole V+ and the cathode of the capacitor 21 is a negative pole V−, where V+ and V− have, for example, an absolute value of 4 V with respect to the common point 32.

The circuit according to the invention includes two operational amplifiers 26 and 27, preferably constituted by respective middle sections of a single integrated circuit, for example the known such Motorola MC 1458 circuit. However, any other known such circuit capable of operation in the manner described and illustrated herein, may similarly be employed. As is known, the contacts 4 and 8 of such integrated circuit are suitable for receiving a continuous feeding voltage and thus must be designed to be connected respectively with the cathode of capacitor 21 and with the anode capacitor 22.

The amplifier 26 is part of a timing stage including a resistor 28 and a capacitor 29 which form a time constant device. The resistor 28 is connected between the output contact 1 and an initial input contact 2 of the amplifier 26, while the capacitor 29 is connected between the contact 2 and the common point 32. The timing stage also includes a bias resistor 30 connected between the contact 1 and a second input contact 3 of the amplifier 26, as well as a bias resistor 31 which is connected between the contact 3 and the common point 32. The operational amplifier 27, in a manner analogous to amplifier 26, is provided with two input contacts 5 and 6 which are connected to the common point 32 through respective bias resistors 33 and 34, as well as with an output contact 7 which is connected to the control electrode of the bi-directional conduction controlled diode 10 through a capacitor 35.

The amplifier 27 is part of an impulse stage generator and its contact 5 is also connected to the output of the amplifier 26 through a series arrangement of a limiter-resistor 55 and of an decoupling diode 36, polarized as shown in the drawing. Moreover, contact 5 is connected to the movable contact 48 of the commutator or switch through a limiter-resistor 37, through which it is suited to receive an alternating voltage (for simplicity, suppose it is sinoidal) proportional to that produced by the generator 100.

The bi-directional conduction controlled diodes 10 and 11 are part of a static switch control stage, and each includes two principal electrode A1 (connected to the terminal 50 of the generator 100) and A2 (connected to the respective movable contact 47 or 48). The control electrodes of the bi-directional conduction controlled diodes 10 and 11 are connected to the respective electrodes A2 through a respective series arrangement of a pair of Zener diodes 38, 39, and 40, 41 the Zener diodes of each pair being oppositely polarized. The control electrode of the bi-directional conduction controlled diode 10 is connected to the terminal 50 of the generator 100 through a bias resistor 42.

For understanding the functioning of the entire circuit, it must be kept in mind that the operational amplifier 26 is suited to furnish at the output 1 the continual voltage V+ applied to the contact 8 when the voltage present at the contact 3 is superior to or less negative than the voltage at the contact 2 (inverting or switching input). On the other hand, the output 1 will furnish the continual voltage V− applied to the contact 4 as soon as the voltage present at the contact 2 is equal to or tends to surpass the voltage at the contact 3. The operational amplifier 27 has a behavior which is completely analogous to that of amplifier 26, with the only variant being that the contact 6 (inverting or switching input) is considered the voltage input relating to the input contact 5 of variable voltage, as will become more evident below. The function of the rectifying and continuous feeding stage is obvious and thus will not be described in detail.

Assume now that the operator wishes to activate the indicator lamps, for example for the left direction, for which the movable-contacts 47 and 48 of the commutator are moved to close contact with terminals of lamps 43 and 45, respectively.

Assume also that the output 1 of the amplifier 26 initially has potential V− with respect to the common point 32, for which the contact 3 comes to have, due to the effect of the voltage divider 30, 31, a negative voltage of, for example, 2 V. The contact 2 of the amplifier 26 tends to bring itself to the potential V− with a delay due to the time constant of the capacitor 29 and of the resistor 28. When the negative potential of the contact 2 reaches that of the contact 3, the output 1 commutes or switches to the potential V+, and to the contact 3 is applied a positive voltage of 2 V. The capacitor 29 then tends to charge itself at the voltage V+, through the resistor 28, and when the positive potential of the contact 2 reaches that of the contact 3 the output 1 changes once again to the voltage value V−. The function of the timing stage follows in an analogous way, and at the output 1 of the operational amplifier 26 there is obtained definitively a square wave 51 whose frequency is a function of the time constant determined by the capacitor 29 and by the resistor 28.

Through the resistors 33 and 34, the contacts 5 and 6 of the operational amplifier 27 are suited to receive a certain continuous polarization voltage which is substantially identical for the two contacts. Such voltage constitutes a fixed reference value for the contact 6, while the contact 5 also receives alternating feeding voltage of a wave 52 of the generator 100, alternating voltage which through the divider constituted by the resistors 37 and 55 has an amplitude limited for example to 0.4 V.

When the output 1 of the amplifier 26 has the value V−, the diode 36 conducts and practically short circuits at the voltage V− the contact 5 of the amplifier 27, which thus cannot be driven by the alternating feeding voltage 52. On the contrary, when the output of the amplifier 26 is at the potential V+, the diode 36 is non-conducting and uncouples the two operational amplifiers 26 and 27. It results then that the input 5 of the amplifier 27 is driven by the alternating voltage 52 and the output 7 sequentially commutes or switches from the potential V− to the potential V+, and vice versa, at each zero changeover of the alternating feeding voltage. For the entire duration of each positive impulse of the square timing wave 51, there is thus present at the output 7 of the amplifier 27 a square wave 53 having the same frequency of the feeding voltage produced by the generator 100.

In a manner known, the square wave 53 is differentiated by the capacitor 35, which transforms it into a signal 54 having equal frequency and furnished with alternating impulses, positive and negative, corresponding to the zero changeovers, respectively in the positive and negative sense, of the feeding voltage of the generator 100.

Consider now the function of the static switch control stage when the square timing wave 51 has a value V−, that is, when the bi-directional conduction controlled diode 10 is not driven by the impulsive signal 54. An excitement current circulates in a path through terminal 49 of the generator 100, lamp 43, movable contact 47, resistor 12, the control electrode and electrode A1 of bi-directional conduction controlled diode 11, and terminal 50 of the generator. The bi-directional conduction controlled diode 11 thus begins conducting, thereby allowing the generator 100 to directly feed the indicator lamp 45, through the movable contact 48.

When the square timing wave 51 has a value V+ and allows the operation of the impulse stage generator, the control electrode of the bi-directional conduction controlled diode 10 is driven by the firing impulses 54, which have the same instantaneous polarity as the alternating voltage present in the electrodes A1, A2. Also, the impulses 54 are in phase with such alternative voltage, for which the bi-directional conduction controlled diode 10 (which begins conducting) is driven in a more satisfactory manner, or in other words with smaller or weak currents corresponding to the first and third quadrant, which is the object of the invention. The conduction of the bi-directional conduction controlled diode 10 practically short circuits the control electrode to the electrode A1 of the bi-directional conduction controlled diode 11, which causes itself to be non-conducting at the successive zero changeover of the voltage at its electrodes A1, A2. The generator 100 can thus feed, through the movable contact 47 and the bi-directional conduction controlled diode 10, the indicator lamp 43.

The operation of the entire device follows in an analogous way, and specifically the lamps 43 and 45 are alternately activated, with a modulation determined by the timing stage, for the entire time in which the movable contacts 47, 48 remain connected to the indicator lamps of the chosen direction.

To optimize the operation of the circuit when the drive shaft of the generator 100 rotates at elevated velocity (compensating for the natural firing delay of the bi-directional conduction controlled diode 10), between the output 7 and the related input 6 of the operational amplifier 27 can be connected a reactive network, for example a resistor 9 indicated by dashed lines and appropriately dimensioned in function to the characteristics of the particular circuit. In this way the square wave 53, limited in amplitude, is brought back to the input 6, which is then subjected to a voltage of variable reference. It results from this that the output 7 of the amplifier 27 commutes between the values V+ and V−, although maintaining the same frequency, with a certain amount of anticipation with respect to the zero changeovers of the feeding voltage of the bi-directional conduction controlled diode 10. Obviously, such anticipation is also present in the impulsive signal 54 which drives the bi-directional conduction controlled diode 10 accordingly.

Consider now the case in which the lamp 43 is interrupted. The lamp 45 cannot be fed because the route for the excitement current of the bi-directional conduction controlled diode 11 is interrupted.

In the case of interruption of the lamp 45, the generator 100 would practically be under no-load conditions during periods in which the bi-directional conduction controlled diode (10) is turned off.

In both cases the voltage produced by the generator 100 would assume very elevated values, such as to cause destruction of any non-power components of the circuit, unless the components themselves have been provided to be undesireably over-sized. Such inconveniences are avoided by the provision of Zener diodes 38, 39, 40, 41 which, being polarized as described and illustrated and being dimensioned in an appropriate manner, provide the bi-directional conduction controlled diodes 10 and 11 (depending on the case) with a polarization such as to automatically bring them into conduction when the alternative feeding voltage surpasses dangerous threshold levels. Nevertheless, if for example lamp 43 is interrupted, lamp 45 will remain activated for the entire time during which the manual commutator having contacts 47, 48 is actuated.

From the above it will be evident how the control circuit according to the present invention achieves in a simple manner the proposed objectives, such as reliable and precise operation, as well as low excitation voltages for the bi-directional conduction controlled diodes and reduced capacity values (in particular of the capacitors 21, 22 and 35) to maintain the bi-directional conduction controlled diodes excited for relatively long periods of time.

In addition, due to the use of an integrated circuit, the timing stage employs passive components which are connected to an active part of the circuit in such a way as not to be sensitive to the variations in feeding voltage and not to be substantially influenced by variations in temperature.

Obviously, the control circuit described can undergo many modifications, without departing from the scope of the present invention. For example, parallel to the bi-directional conduction controlled diode 11 can be connected a warning light 56, suited to be cyclically activated according to the conduction of the bi-directional conduction controlled diodes and to signal by variations in operation possible anomalies in the power stage, in particular, interruptions in operation of the lamps 43–46.

We claim:

1. A control circuit for use in controlling direction indicator lamps of a vehicle of the type including an alternating voltage generator for generating an alternating voltage, a switch means for selective manual connection to selected direction indicator lamps, and at least one bi-directional conduction controlled diode having a control electrode and positioned between said alternating voltage generator and said switch means to feed an alternating voltage to said direction indicator lamps selected by the switch means, said control circuit comprising:

an impulse stage generator means, having an output connected to said control electrode of said diode and supplied with said alternating voltage from said alternating voltage generator, for producing an output signal of alternating current impulses which are synchronized with zero changeover points of said alternating voltage and for supplying said output signal to said control electrode; and a timing stage means, having an output connected to said impulse stage generator means, for generating a timing signal of alternating blocking and admitting impulses and for supplying said timing signal to said impulse stage generator means to control the operation thereof.

2. A control circuit as claimed in claim 1, wherein said impulse stage generator means comprises an initial operational amplifier having first and second inputs connected to a point of reference potential, said first input being driven by said alternating voltage, and having an output connected to said control electrode of said diode by a first capacitor.

3. A control circuit as claimed in claim 2, wherein said timing stage means comprises a second operational amplifier having first and second inputs, and having an output connected to said point of reference potential by a voltage divider having an intermediary point connected to said second input of said timing stage means, said first input of said second operational amplifier being connected to said point of reference potential by a second capacitor and to said output of said second operational amplifier by a resistor, said second capacitor and said resistor together forming a time constant device.

4. A control circuit as claimed in claim 3, wherein said first input of said initial operational amplifier is connected to said output of said second operational amplifier by a decoupling diode.

5. A control circuit as claimed in claim 2, wherein said second input and said output of said initial operational amplifier are connected by a feedback network.

6. A control circuit as claimed in claim 1, wherein said bi-directional conduction controlled diode further includes first and second principal electrodes, said second principal electrode being connected to said control electrode of said diode by a series arrangement of first and second Zener diodes having opposite polarities.

7. In a vehicle including direction indicator lamps, an alternating voltage generator for generating alternating voltage, a switch means for selective manual connection to selected direction indicator lamps, at least one bi-directional conduction controlled diode having a control electrode, said diode being positioned between said alternating voltage generator and said switch means to feed said alternating voltage to said direction indicator lamps selected by said switch means, and a control circuit for controlling the operation of said direction indicator lamps, the improvement wherein said control circuit comprises:
   an impulse stage generator means, having an output connected to said control electrode of said diode and supplied with said alternating voltage from said alternating voltage generator, for producing an output signal of alternating current impulses which are synchronized with zero changeover points of said alternating voltage and for supplying said output signal to said control electrode; and
   a timing stage means, having an output connected to said impulse stage generator means, for generating a timing signal of alternating vlocking and admitting impulses and for supplying said timing signal to said impulse stage generator means to control the operation thereof.

8. The improvement claimed in claim 7, wherein said impulse stage generator means comprises an initial operational amplifier having first and second inputs connected to a point of reference potential, said first input being driven by said alternating voltage, and having an output connected to said control electrode of said diode by a first capacitor.

9. The improvement claimed in claim 8, wherein said timing stage means comprises a second operational amplifier having first and second inputs, and having an output connected to said point of reference potential by a voltage divider having an intermediary point connected to said second input of said timing stage means, said first input of said second operational amplifier being connected to said point of reference potential by a second capacitor and to said output of said second operational amplifier by a resistor, said second capacitor and said resistor together forming a time constant device.

10. The improvement claimed in claim 9, wherein said first input of said initial operational amplifier is connected to said output of said operational amplifier by a decoupling diode.

11. The improvement claimed in claim 8, wherein said second input and said output of said initial operational amplifier are connected by a feedback network.

12. The improvement claimed in claim 7, wherein said bi-directional conduction controlled diode further includes first and second principal electrodes, said second principal electrode being connected to said control electrode by a series arrangement of first and second Zener diodes having opposite polarities.

* * * * *